United States Patent Office 2,915,524
Patented Dec. 1, 1959

2,915,524

NAPHTHYL PYRIDINIUM INNER SALTS

Price Truitt, Denton, Tex., assignor to Parke, Davis & Company, Detroit, Mich., a corporation of Michigan No Drawing. Application April 28, 1958
Serial No. 731,091

9 Claims. (Cl. 260—297)

The present invention is concerned with pyridinium compounds and methods for their manufacture. More particularly, it is concerned with 1-(1,4-dioxo-3-hydroxy-1,4-dihydro-2-naphthyl)-4-(hydrocarbon substituted) pyridinium inner salts which can be represented by the formula

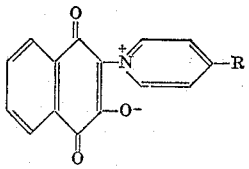

wherein R is a saturated hydrocarbon radical having more than 5 and fewer than 12 carbon atoms.

In the foregoing formula R can represent an alkyl radical such as a straight- or branched-chain hexyl, heptyl, octyl, nonyl, decyl, or undecyl radical. R can also represent a cycloaliphatic hydrocarbon radical such as a cyclohexylalkyl or alkyl- (including polyalkyl-) substituted cyclohexylalkyl radical, subject to the limitation that R shall contain more than 5 and fewer than 12 carbon atoms. Thus, R can represent cyclohexylmethyl, cyclohexylethyl, cyclohexylpropyl, cyclohexylbutyl, cyclohexylpentyl, and alkyl-substituted cyclohexylalkyl radicals of fewer than 12 carbon atoms.

Compounds of the present invention can be prepared by the reaction of a 2,3-dihalo-1,4-naphthoquinone such as 2,3-dichloro-1,4-naphthoquinone or 2,3-dibromo-1,4-naphthoquinone with a hydrocarbon-substituted pyridine derivative of the formula

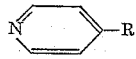

wherein R is defined as before. The reaction is suitably carried out at an elevated temperature, as by heating the mixture for about one hour at 100° C., although satisfactory results can be obtained at substantially lower and substantially higher temperatures by altering the reaction time. Useful solvents for this reaction include lower alkanoic acids and particularly acetic acid.

The hydrocarbon-substituted pyridine derivatives employed as starting materials in the practice of this invention are commercially available or can be prepared by methods known in the art. For example, in one such method 4-methylpyridine is reacted with sodamide or potassium amide and an alkyl halide of the formula R'X 

where X is halogen such as bromine and R' is a hydrocarbon radical having one less carbon atom than R. Thus, a solution of one mole of sodamide in liquid ammonia is treated with one mole of 4-methylpyridine and then one mole of an alkyl bromide dissolved in ether. The mixture is then allowed to evaporate to dryness over a period of 12-24 hours and the residue is partitioned between water and ether. The desired pyridine derivative is then recovered from the ethereal phase by crystallization or fractional distillation.

The inner salts of the present invention are useful antiparasitic agents and in particular have antiamebic and antitrichomonal properties. Among the highly active amebicides of this invention are 1-(1,4-dioxo-3-hydroxy-1,4-dihydro-2-naphthyl)-4-(1-octyl)pyridinium inner salt; 1-(1,4-dioxo-3-hydroxy-1,4-dihydro - 2 - naphthyl)-4-(4-methylcyclohexylmethyl)pyridinium inner salt; 1-(1,4-dioxo-3-hydroxy-1,4-dihydro-2-naphthyl)-4-(3 - methylcyclohexylmethyl)pyridinium inner salt; 1-(1,4-dioxo-3-hydroxy-1,4-dihydro-2-naphthyl)-4 - (3,5 - dimethylcyclohexylmethyl)pyridinium inner salt; and 1-(1,4-dioxo-3-hydroxy-1,4-dihydro-2-naphthyl)-4-(3-cyclohexylpropyl)-pyridinium inner salt. These compounds are amebicidal against E. histolytica in vitro at concentrations in the range of 2–35 μg./ml. and also possess marked activity in vivo.

This invention is illustrated, but not limited, by the following examples:

Example 1.—A solution of 20 g. of 4-(1-octyl)pyridine in 20 ml. of acetic acid is added rapidly to a solution of 23 g. of 2,3-dichloro-1,4-naphthoquinone in 250 ml. of acetic acid at 100° C. The reaction mixture is heated at 100–110° C. for one hour and is then cooled and diluted with 250 ml. of ice water. The precipitated product is collected on a filter and purified by crystallizations from acetic acid-water and from dimethylformamide. This compound is 1-(1,4-dioxo-3-hydroxy-1,4-dihydro-2-naphthyl)-4-(1-octyl)pyridinium inner salt, which melts at about 230–231° C. and has the following formula

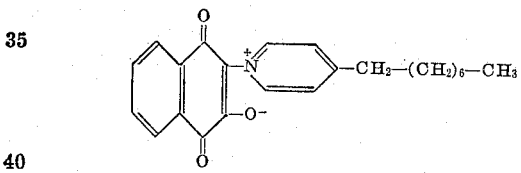

Example 2.—By the process of Example 1, with the substitution of 21.4 g. of 4-(1-nonyl)pyridine for the 4-(1-octyl)pyridine, the compound obtained is 1-(1,4-dioxo-3-hydroxy-1,4-dihydro-2-naphthyl)-4 - (1-nonyl)pyridinium inner salt; M.P. about 208–210° C.

Example 3.—By the process of Example 1, with the substitution of 24.4 g. of 4-(1-undecyl)pyridinium for the 4-(1-octyl)pyridine, the compound obtained is 1-(1,4-dioxo-3-hydroxy-1,4-dihydro-2-naphthyl)-4-(1 - undecyl)-pyridinium inner salt.

Example 4.—By the process of Example 1, with the substitution of 17.0 g. of 4-(1-hexyl)pyridine for the 4-(1-octyl)pyridine, the compound obtained is 1-(1,4-dioxo-3-hydroxy-1,4-dihydro-2-naphthyl)4 -(1 - hexyl)pyridinium inner salt; M.P. about 229–230° C.

Example 5.—By the process of Example 1, with the substitution of 18.3 g. of 4-(cyclohexylmethyl)pyridine for the 4-(1-octyl)pyridine, the compound obtained is 1-(1,4-dioxo-3-hydroxy-1,4-dihydro-2-naphthyl)-4-(cyclohexylmethyl)pyridinium inner salt; M.P. about 201–207° C.

Example 6.—By the process of Example 1, with the substitution of 21.2 g. of 4-(3-cyclohexylpropyl)pyridine for the 4-(1-octyl)pyridine, the compound obtained is 1-(1,4-dioxo-3-hydroxy-1,4-dihydro-2-naphthyl) - 4-(3-cyclohexylpropyl)pyridinium inner salt; M.P. about 218–219° C.

Example 7.—By the process of Example 1, with the substitution of 22.8 g. of 4-(1-cyclohexylbutyl)pyridine for the 4-(1-octyl)pyridine, the compound obtained is 1-(1,4-dioxo-3-hydroxy-1,4-dihydro-2-naphthyl)-4-(1-cyclohexylbutyl)pyridinium inner salt; M.P. about 215–220° C.

*Example 8.*—By the process of Example 1, with the substitution of 24.2 g. of 4-(1-cyclohexylpentyl)pyridine for the 4-(1-octyl)pyridine, the compound obtained is 1-(1,4-dioxo-3-hydroxy-1,4-dihydro-2-naphthyl) - 4-(1-cyclohexylpentyl)pyridinium inner salt; M.P. about 178–183° C.

*Example 9.*—By the process of Example 1, with the substitution of 19.8 g. of 4-(3-methylcyclohexylmethyl)-pyridine for the 4-(1-octyl)pyridine, the compound obtained is 1-(1,4-dioxo-3-hydroxy-1,4-dihydro-2-naphthyl)-4-(3-methylcyclohexylmethyl)pyridinium inner salt; M.P. 169–172° C.

*Example 10.*—By the process of Example 1, with the substitution of 19.8 g. of 4-(2-methylcyclohexylmethyl)-pyridine for the 4-(1-octyl)pyridine, the compound obtained is 1-(1,4-dioxo-3-hydroxy-1,4-dihydro-2-naphthyl)-4-(2-methylcyclohexylmethyl)pyridinium inner salt; M.P. 184–187° C.

*Example 11.*—By the process of Example 1, with the substitution of 19.8 g. of 4-(4-methylcyclohexylmethyl)-pyridine for the 4-(1-octyl)pyridine, the compound obtained is 1-(1,4-dioxo-3-hydroxy-1,4-dihydro-2-naphthyl)-4-(4-methylcyclohexylmethyl)pyridinium inner salt; M.P. 199–200° C.

*Example 12.*—By the process of Example 1, with the substitution of 22.8 g. of 4-(4-ethylcyclohexylmethyl)-pyridine for the 4-(1-octyl)pyridine, the compound obtained is 1-(1,4-dioxo-3-hydroxy-1,4-dihydro-2-naphthyl)-4-(4-ethylcyclohexylmethyl)pyridinium inner salt; M.P. 193–195° C.

*Example 13.*—By the process of Example 1, with the substitution of 22.8 g. of 4-(3,4-dimethylcyclohexylmethyl)pyridine for the 4-(1-octyl)pyridine, the compound obtained is 1-(1,4-dioxo-3-hydroxy-1,4-dihydro-2-naphthyl) - 4 - (3,4-dimethylcyclohexylmethyl)pyridinium inner salt; M.P. with decomposition about 167° C.

*Example 14.*—By the process of Example 1, with the substitution of 22.8 g. of 4-(3,5-dimethylcyclohexylmethyl)pyridine for the 4-(1-octyl)pyridine, the compound obtained is 1-(1,4-dioxo-3-hydroxy-1,4-dihydro-2-naphthyl)-4-(3,5 - dimethylcyclohexylmethyl)pyridinium inner salt; M.P. about 152–153° C.

What is claimed is:
1. A compound of the structural formula,

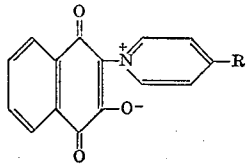

wherein R is a saturated hydrocarbon radical having more than 5 and fewer than 12 carbon atoms and selected from the class consisting of alkyl, cyclohexylalkyl and alkyl-substituted cyclohexylalkyl radicals.

2. A compound of the structural formula,

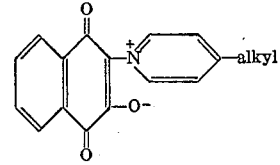

wherein the alkyl radical is an alkyl radical having more than 5 and fewer than 12 carbon atoms.

3. 1-(1,4-dioxo-3-hydroxy-1,4-dihydro-2 - naphthyl)-4-(1-octyl)pyridinium inner salt.

4. A compound of the structural formula,

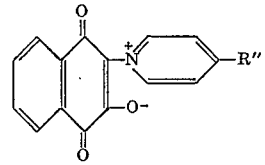

wherein R" is an alkylcyclohexylalkyl radical having fewer than 12 carbon atoms.

5. 1-(1,4-dioxo-3-hydroxy-1,4-dihydro-2 - naphthyl)-4-(4-methylcyclohexylmethyl)pyridinium inner salt.

6. 1 - (1,4-dioxo-3-hydroxy-1,4-dihydro-2-naphthyl)-4-(3-methylcyclohexylmethyl)pyridinium inner salt.

7. 1 - (1,4-dioxo-3-hydroxy-1,4-dihydro - 2-naphthyl)-4-(3,5-dimethylcyclohexylmethyl)pyridinium inner salt.

8. A compound of the structural formula,

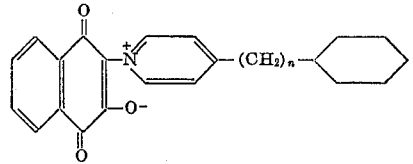

wherein n is a positive integer less than 6.

9. 1-(1,4-dioxo-3-hydroxy-1,4-dihydro - 2 - naphthyl)-4-(3-cyclohexylpropyl)pyridinium inner salt.

References Cited in the file of this patent
UNITED STATES PATENTS
2,541,473 Leffler _____ Feb. 13, 1951

OTHER REFERENCES
Calandra et al.: J. Amer. Chem. Soc., vol. 72 (1950), p. 4804.